Aug. 21, 1956 — A. KEEL — 2,759,423
POWER TRANSMISSION
Filed Nov. 28, 1952 — 3 Sheets-Sheet 1
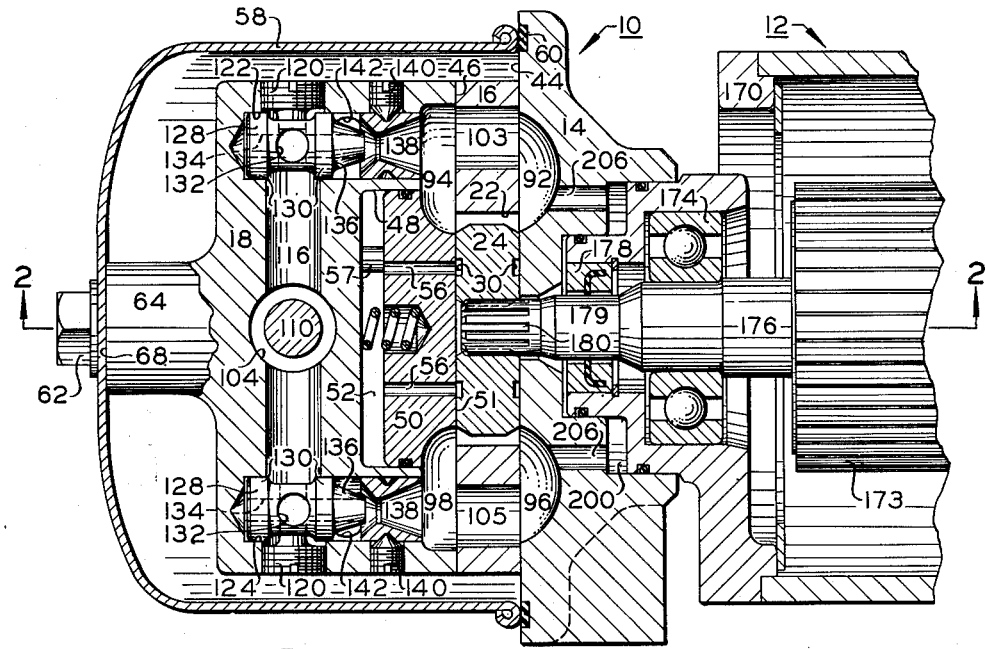
FIG. 1
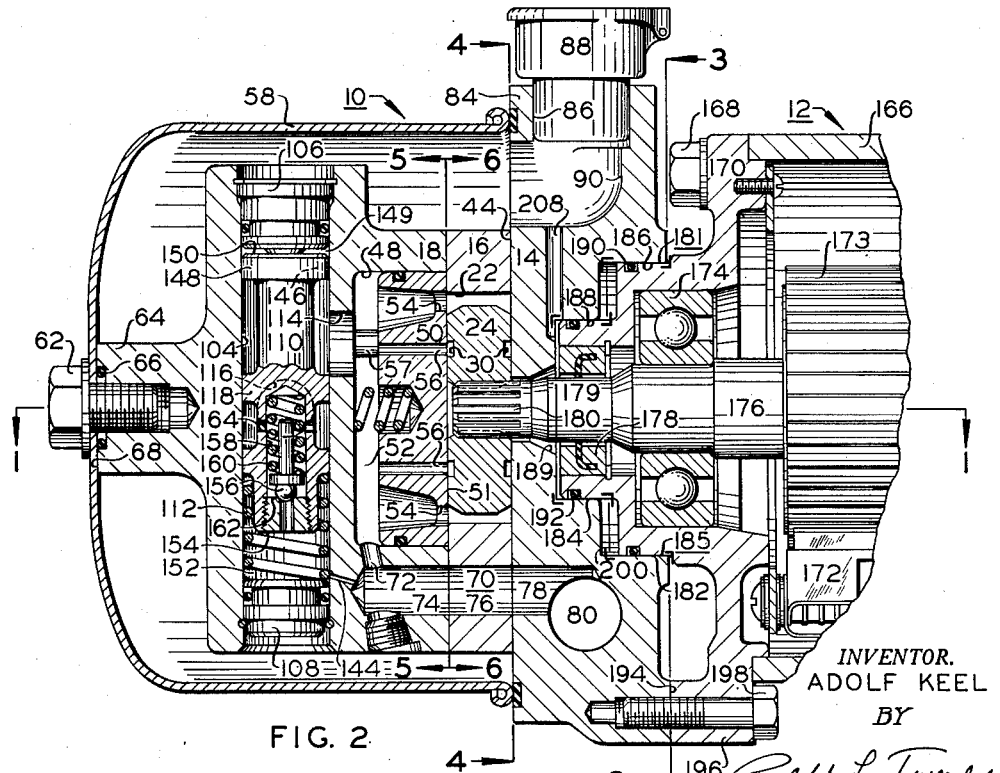
FIG. 2
INVENTOR.
ADOLF KEEL
BY
ATTORNEY Aug. 21, 1956  A. KEEL  2,759,423
POWER TRANSMISSION
Filed Nov. 28, 1952  3 Sheets-Sheet 2

INVENTOR.
ADOLF KEEL
BY
Ralph L. Tweedale
ATTORNEY

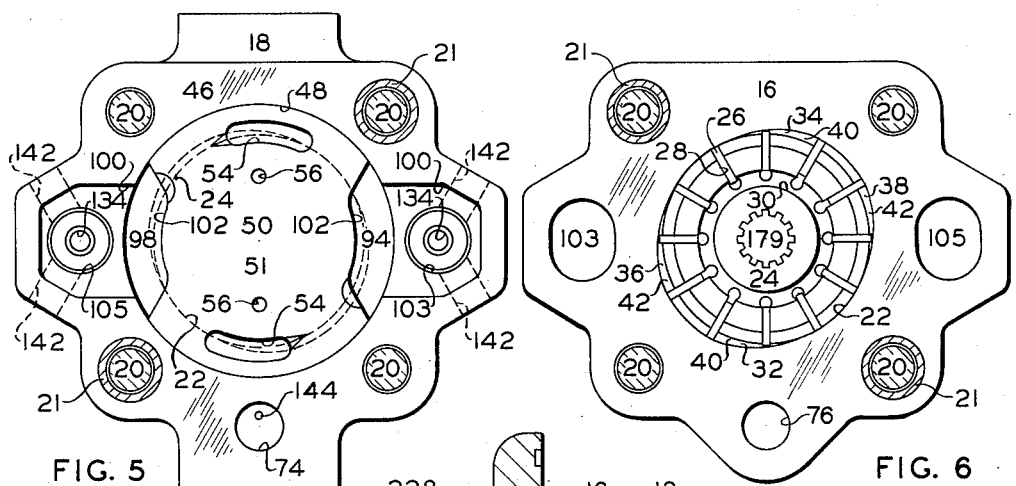
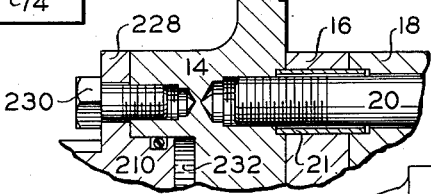
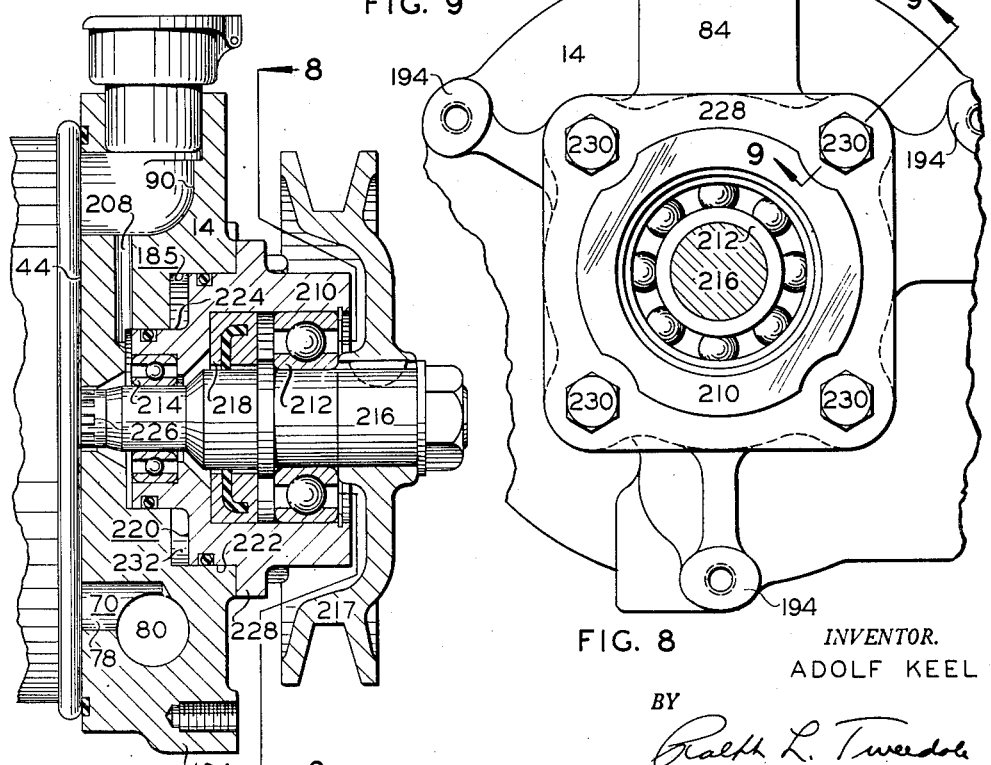

United States Patent Office 2,759,423
Patented Aug. 21, 1956

2,759,423
POWER TRANSMISSION

Adolf Keel, Highland Park, Mich., assignor to Vickers Incorporated, Detroit, Mich., a corporation of Michigan Application November 28, 1952, Serial No. 322,841

8 Claims. (Cl. 103—5)

This invention relates to power transmissions, and is particularly applicable to those of the type comprising two or more fluid pressure energy translating devices, one of which may function as a pump and another as a fluid motor.

The invention relates generally to pumps and more particularly to the type of unit known as a "power pack" comprising a pump, a fluid reservoir and usually a valve or valves integrated into a compact unit. These power pack units have had wide acceptance in the automotive and agricultural fields due to their compactness and ease of installation. Simplicity and ruggedness of construction, low cost, long life and efficient operation are of paramount importance in the design of such a unit. With the increasing emphasis being put on passenger car applications of hydraulic power, such as hydraulic steering boosters, hydraulic window lifts, etc., quietness of operation has become an additionally important criterion of such units.

In the past it has been standard practice to utilize a belt and pulley to provide the driving connection between such units and the vehicle engine. One of the most common arrangements is provision of a separate pulley on the unit drive shaft which engages the vehicle fan belt. Often a special engine driven belt is provided. While quite satisfactory from the functional standpoint, such separate drive arrangements have the disadvantage that the power unit installation requires a considerable amount of space, which in motor vehicle applications is at a premium. Another disadvantage of such an arrangement is that a separate mounting bracket is required with the added expense and complexity incident thereto.

To avoid the disadvantage of separate mounting, it is proposed to mount the unit in a driving relation with another rotary accessory, such as the vehicle generator. However, such an arrangement gives rise to new problems, one of these being that the generator manufacturer and the hydraulic power unit manufacturer in all probability are not the same. It therefore becomes difficult, if not impossible, for the manufacturer of each of the components to complete fabrication and testing thereof.

It is an object of the present invention to provide a low cost and efficient fluid power unit driven by a rotary vehicle accessory, thus avoiding the disadvantages of separate mounting.

More particularly, it is an object of this invention to provide a generator and pump combination, the individual components of which can be completely fabricated and tested before being combined.

Another object is provision of a generator and pump combination in which various parts act in a dual capacity thus simplifying the unit and lowering its cost.

Fluid requirements of motor vehicle accessories such as hydraulic steering boosters, may be as high when the engine is idling as they are when it is at high speed. Thus a fluid pump to supply those accessories must have a substantial delivery rate while the engine idles. Since the speed of a motor vehicle engine varies in a ratio of approximately one to ten, from idle to full speed, the speed of a pump coupled to a directly driven generator will vary in the same ratio, resulting in excessive delivery rates with resulting power loss during highway operation of the vehicle. A spillover type flow control valve responsive to the pump delivery rate is an effective solution to this problem.

A further problem which arises from coupling the fluid power unit with the generator lies in the extremely high speeds involved in generator operation. For example, the speed of a generator driven by a vehicle engine may reach speeds of the order of 8000 R. P. M. At speeds of this magnitude the inlet zones of a fluid pumping unit may fail to fill completely, resulting in the phenomenon of cavitation and its attendant noise and excessive wear.

It is, therefore, also an object of this invention to provide a hydraulic power unit capable of functioning at the extremely high speeds involved in generator operation.

More particularly, it is an object to provide such a unit having improved inlet porting adjacent the inlet zones of the pumping mechanism and having improved means for supercharging the inlet zones.

Since important economies may be effected in large volume production, it is highly desirable that any particular unit being manufactured is capable of varied uses.

It is therefore another object of the present invention to provide a hydraulic power pack unit especially suited for combination with a dynamo electric device, but which may be easily and at low cost adapted for separate use.

Further objects and advantages of the present invention will be apparent from the following description, reference being had to the accompanying drawings wherein a preferred form of the present invention is clearly shown.

In the drawings:

Figure 1 is a longitudinal sectional view of a device embodying the present invention.

Figure 2 is a section taken on line 2—2 of Figure 1.

Figure 5 is a partial section taken on line 5—5 of Figure 2.

Figure 6 is a partial section taken on line 6—6 of Figure 2.

Figure 7 is a partial longitudinal section showing the pumping mechanism of the present invention adapted for separate use.

Figure 8 is a partial section taken on line 8—8 of Figure 7.

Figure 9 is a partial section taken on line 9—9 of Figure 8.

Figure 3:
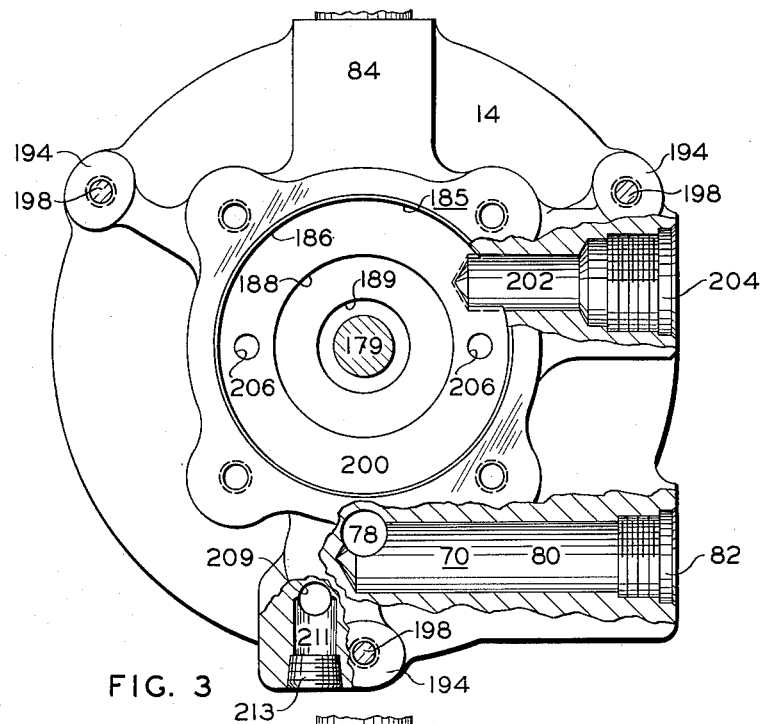
Figure 3 is a transverse section taken on line 3—3 of Figure 2.

Referring now to Figure 1, there is shown a pump generally designated 10 and a generator generally designated 12. The pump 10 comprises a body 14, a ring 16, and a head 18, arranged in a sandwich relation, and secured together by bolts 20 extending through head 18 and ring 16 into threaded holes in body 14. Each of a diametrically opposed pair of the bolts 20 is encircled by a cylindrical dowel 21. Dowels 21 maintain the proper angular relation between the body 14, ring 16, and head 18. This arrangement is most clearly shown in Figure 9.

The ring 16 provides a stator element having a generally elliptically contoured bore 22 therein. A rotor 24 carrying a plurality of vanes 26 slidable in substantially radial slots 28 is positioned in bore 22 in a telescopic relation with ring 16. During operation of the pump, the ends of vanes 26 are maintained radially outward against the bore 22 by centrifugal force aiding by pressure conducted to the ends of the vanes through a pair of similarly proportioned annular channels 30 in rotor 24, which intersect the enlarged ends of slots 28.

The spaces between adjacent vanes may be termed working chambers, and it should be noted that each has a complementary working chamber diametrically opposed thereto. For example, chambers 32 and 34 are a complementary pair, as are chambers 36 and 38. Assuming counterclockwise rotation of rotor 24 and as viewed in Figure 6, it can be seen that the chambers 36 and 38 are at the moment increasing in volume, while chambers 32 and 34 are decreasing. Those portions of the space between the ring and the rotor through which the working chambers pass while decreasing in size may be termed "outlet zones" 40, while those through which they pass while increasing in size may be termed "inlet zones" 42. Since each zone has a diametrically opposed complementary zone, a hydraulically balanced pumping is thus provided. Such pumping mechanism is described in more detail in the patent to Harry F. Vickers, No. 1,989,900.

Body 14 includes a plane face 44 which axially abuts ring 16, and against which rotor 24 and the vanes 26 are axially slidable. The axially opposed end of ring 16 is abutted by a plane face 46 of the head 18. A recess 48 extends into head 18 from the face 46. A pressure plate 50 is axially slidable in recess 48 and has a face 51 which axially abuts ring 16, rotor 24, and vanes 26. Pressure plate 50 is in peripheral fluid sealing engagement with recess 48 and cooperates therewith to form a pressure chamber 52. It can be seen that pressure in chamber 52 will bias pressure plate 50 axially into engagement with ring 16, rotor 24, and vanes 26. Further, since rotor 24 is made slightly thinner than ring 16 to provide running clearance, pressure in chamber 52 will induce deflection of plate 50 into the bore 22 toward rotor 24, thus reducing end clearance and leakage at high pressures. The sealing action of pressure plate 50 is described in more detail in the patent to Duncan B. Gardiner, et al., No. 2,544,988.

As heretofore mentioned, the working chambers between adjacent vanes are decreasing in size as they pass through the outlet zones 40. A pair of kidney-shaped outlet ports 54 overlie the outlet zones 40 and extend completely through the pressure plate 50 into pressure chamber 52. Fluid displaced by the pumping mechanism passes through ports 54 into pressure chamber 52 where operating pressure of the unit thus exists. Drilled passages 56 extend through the pressure plate 50 to communicate with the annular channels 30 for the purpose heretofore mentioned.

A dowel pin 57 extends from head 18 into pressure plate 50 to maintain the proper angular relation therebetween.

From chamber 52 fluid displaced by the pumping mechanism passes through a delivery passage generally designated 70. Passage 70 includes a relatively restricted portion 72 which extends from pressure chamber 52 into an axially extending passage 74. Passage 74 cooperates with a passage 76 in the ring 16 and a similar passage 78 in the body 14. Passages 74, 76, and 78 are coincident at the juncture of body 14, ring 16, and head 18. Passage 78 in body 14 is intersected by a transverse passage 80 which leads to a threaded external delivery connection port 82.

The face 44 of body 14 against which ring 16 and the rotor 24 abut extends laterally beyond the periphery of ring 16. An open end tank 59 extends axially over the head 18 and ring 16 to abut the face 44. A deformable sealing element 60 is adapted to be compressed between body 14 and the open end of tank 58, thus providing a fluid tight juncture. Tank 58 is secured in place by a single bolt 62 which extends through the closed end thereof and engages screw threads in the axially extending portion 64 of head 18. A deformable sealing element 66 encircles the bolt 62 and is compressed between tank 58 and head 18 to prevent leakage from the tank interior. This arrangement has the advantage of utilizing pump body 14 as a closure for the open end of tank 58 and also provides a unit having maximum reservoir capacity while occupying a minimum of space. This results from the fact that fluid in the tnak 58 will completely surround head 18 and the ring 16, thus filling with fluid all indentations and irregularities in conformation.

An advantage of having the tank fastening bolt 62 extend through the closed end of the tank to engage head 18 is that, thus placed, no space consuming flanges are required on the tank and body 14 to provide bolt space. The axial distance from face 44 to the end face 68 of head 18 is selected to be slightly less than the axial distance from the inside of the closed end of tank 58 to the open end thereof abutting face 44. Thus on tightening bolt 62, the tank 58 will be bolted firmly against the face 44 and a slight deformation of the tank 58 will take place to compress sealing member 66.

Body 14 is provided with a boss 84 having an external filler opening 86 therein. A filler neck and cap assembly 88 is pressed into opening 86. A passage 90 extends from opening 86 to the face 44 of body 14 inside tank 58. The normal mounting position of pump 10 is with filler opening 86 uppermost, whereby tank 58 may be filled and fluid can be added to the system as required.

Each inlet zone 42 has two axially opposed inlet ports cooperating therewith. Such an arrangement is highly desirable, since fluid to fill the inlet zones can enter them from both sides, thus reducing the time required to effect complete filling. The inlet ports comprise paired pockets overlying the axially opposed ends of each zone. Pockets 92 and 94 are a cooperating pair as are 96 and 98. Pockets 92 and 96 are formed by recesses in the face 44 of the body 14, and are laterally bounded by the juncture of face 44 with ring 16 and rotor 24. Pockets 94 and 98 are formed by recesses 100 in the head 18 extending inwardly to communicate with laterally outward opening recesses 102 in the pressure plate 50 as can best be seen in Figure 5. Pockets 94 and 98 are laterally bounded by the juncture of face 51 of pressure plate 50 with ring 16 and rotor 24 and by juncture of face 46 of head 18 with ring 16. The pockets 92 and 96 as well as pockets 94 and 98 extend laterally outward from inlet zones 42 to overlie a portion of ring 16. An axial passage 103 extends through ring 16 to interconnect pockets 92 and 94 and a similar passage 105 interconnects pockets 96 and 98.

Figure 4:
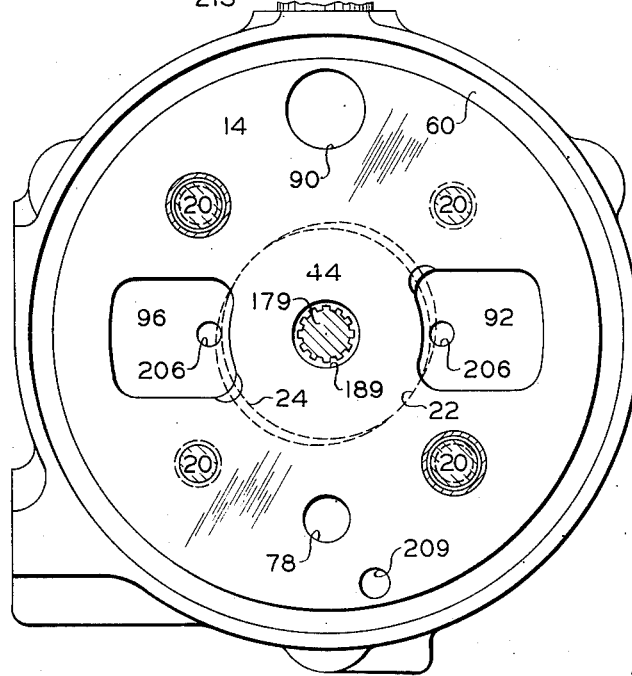
Figure 4 is a section taken on line 4—4 of Figure 2.

It should be noted here that the dotted outlines of bore 22 and rotor 24 which appear in Figures 4 and 5 merely indicate positional relations and are not hidden object lines.

Head 18 has a transverse bore 104 extending completely therethrough. Bore 104 is closed at its opposite ends by a pair of plugs 106 and 108. A valve spool 110 is slidably inserted in bore 104. A spring 112 acts between plug 108 and valve spool 110 to bias the spool upwardly into a normal position contacting plug 106. Bore 104 is intersected by axial passage 114 which communicates with pressure chamber 52. Bore 104 is also intersected perpendicularly by a transverse bore 116. A land 118 on spool 110 isolates passage 114 and passage 116 in the spring biased normal position. Bore 116 extends completely across head 18 and is closed at its opposite ends by a pair of plugs 120. Axial passages 122 and 124 extend from each of the pockets 94 and 98, respectively, to intersect bore 116 for the purpose of supercharging the pump inlet zones as hereinafter described.

Each of the passages 122 and 124 has a spool 128 inserted therein which is retained in the passage by a projection on each of plugs 120. The spools 128 each have a pair of lands 130 thereon which engage passages 122 and 124 in fluid sealing engagement at opposite sides of their intersection with passage 116. The spools 128 each have a radial passage 132 therein which communicates with an axial central passage 134 extending completely through the spool. The spools 128 have an externally tapered end 136. Also inserted in passages 122 and 124 are a pair of sleeves 138 which are retained by a pair of set screws 140. Sleeves 138 are positioned in proximity to the tapered ends of spools 128 and have a venturi throat therein. Each of the bores 122 and 124 is intersected between the spool 128 and sleeve 138 by a pair of drilled passages 142 which extend outwardly to the exterior of head 18 and are thus in communication with the interior of tank 58.

As heretofore discussed, fluid displaced by the pumping mechanism is discharged through outlet passage 70. A restricted drilled passage 144 connects from outlet passage 70 to bore 104 from a point downstream of the restriction 72. Spool 110 is provided with a drilled passage 146 which extends through the upper land 148 to a pressure chamber 149. It can be seen that pressure in pressure chamber 52 is transmitted to chamber 149 and is exerted on the axial projection of area 150 at the upper end of spool 110 tending to move the valve downward against spring 112 as viewed in Figure 2. Further, it can be seen that pressure in delivery passage 70 downstream of restricted passage 72 is conducted through passage 144 into the chamber 152 between the plug 108 and the lower end of spool 110 to act on the axial projection of the equal opposed area 154 at the lower end of valve 110. The restricted passage 72 thus acts as a metering orifice, pressure at the opposite sides of which is exerted on opposing areas of the valve 110.

It can be seen that until the pressure unbalance across orifice 72 acting on spool 110 is sufficient to compress spring 112, the entire output of the pumping mechanism will go through the outlet passage 70 to the external delivery connection port 82. However, when the drop across orifice 72 reaches the amount necessary to compress spring 112, the spool will move downward and land 118 will move across and uncover the transverse bore 116, thus venting chamber 52 to the interior of tank 58. As the pump delivery volume increases beyond the cracking point of valve 110, the valve will open wider, thus bypassing a greater part of the pump delivery. At all speeds above the cracking point of valve 110, the valve will tend to maintain the pressure drop across the orifice 116 constant, thereby maintaining the flow rate therethrough constant.

Valve 110 has a further function in that it operates as a pilot-controlled relief valve. The pilot valve 156 is positioned in a central bore 158 in valve 110. A spring 160 biases pilot valve 156 toward a seat 162. The central bore 158 is vented to the interior of tank 58 through passages 164 in spool 110, bore 116, the central passage 134 in spools 128 and the drilled passages 142 in head 18. Spring 160 is so selected as to maintain pilot valve 156 seated until pressure in the pump outlet passage reaches a predetermined maximum value. At this time pilot valve 156 opens, venting fluid from the chamber 152, thus creating a pressure drop across restriction 144, and hence a drop in the pressure in chamber 152, such that pressure in chamber 149 opens valve 110 to bypass sufficient of the pump flow to keep the operating pressure within safe limits.

The generator 12 includes a frame 166 which has secured thereto by bolts 168 an end bell 170. End bell 170 includes the usual support for brushes 172 which contact the commutator of armature 173, and has therein a bearing 174 which supports the generator armature shaft 176. End bell 170 also carries a shaft seal 178 which encircles an extension 179 of the generator armature shaft 176. Extension 179 of shaft 176 protrudes outward of shaft seal 178 and is splined at 180 to drivingly engage rotor 24 of pump 10.

End bell 170 includes a stepped pilot 181 having a large diameter indicated at 182 and a small diameter indicated at 184. Body 14 of pump 10 has therein a stepped bore 185 having a large diameter indicated at 186, a small diameter indicated at 188, and a shaft clearance hole 189 extending through face 44. Diameters 182 and 186 are selected for snug engagement as are diameters 184 and 188. An O ring seal 190 insures a fluid-tight juncture between the larger diameters, and similar seal 192 insures fluid-tight juncture between the smaller diameters. Body 14 has thereon three bosses 194 which have tapped holes therein. The end bell of generator 12 includes cooperating bosses 196 through which coupling bolts 198 extend to secure the end bell and the pump body firmly together.

Abutment of bosses 194 and 196 establishes the assembled relative axial positions of pump 10 and generator 12. In the assembled position the shoulders of the stepped bore 185 in body 14 and of the pilot 181 on end bell 170 are axially spaced apart to form an annular passage 200. Seals 190 and 192 prevent leakage from passage 200. A drilled passage 202 in body 14 is provided with a threaded external connection port 204 and extends inward to break into the stepped bore 185 as can best be seen in Figure 3. Port 204 is thus in communication with passage 200. A pair of axial drilled passages 206 in body 14 connects pockets 92 and 96 with passage 200. The external return connection port 204 thus communicates through passages 202, 200, and 206 with the inlet port pockets 92 and 96.

Fluid leaking inwardly between rotor 24 and face 44 of body 14 and between rotor 24 and face 51 of pressure plate 50 will enter bore 189 and encircle the projecting end of shaft 176. The shaft seal 178 carried by end bell 170 prevents this leakage fluid from entering the generator housing. A vertical drilled passage 208 in body 14 provides a return to the interior of tank 58 for this leakage fluid.

Body 14 includes an axially drilled passage 209 which extends from the face 44, inside tank 58, to intersect a vertical passage 211 extending to the bottom of body 14 where it is closed by a plug 213. On removal of plug 213, passages 209 and 211 permit drainage of tank 58.

Figure 7 illustrates the pumping mechanism 10 of the present invention equipped for separate use apart from generator 12. Unit 10 is easily and inexpensively adapted for use as a separate pumping unit. A bearing sleeve 210 is provided which has a pair of spaced shaft support bearings 212 and 214 therein. A drive shaft 216 having a V belt pulley 217 thereon is supported between bearings 212 and 214 and is encircled by a conventional shaft seal 218 in the sleeve. Bearing sleeve 210 has thereon a stepped pilot 220 which has large and small diameters 222 and 224, respectively, which are identical with diameters 182 and 184 of the generator end bell pilot 181, and engage the mating diameters of stepped bore 185 in the same manner. Drive shaft 216 includes a spline at 226 which engages rotor 24 of the pumping mechanism in the same manner as the corresponding spline on the armature shaft 176 of generator 12. Bearing sleeve 210 is flanged at 228 to abut body 14 of the pumping unit and has therein mounting holes through which a plurality of bolts 230 extend to secure sleeve 210 to the pumping unit body 14. A return passage 232 is formed between the shoulders of pilot 220 and bore 185 in the same manner return passage 200 is formed in the generator pump combination. The tapped holes in the bosses 194, which in the generator pump combination are utilized to secure the pump to the generator end bell, may be used for mounting the separate unit.

Assembly of the generator and pump combination is effected with extreme ease and rapidity. On relative axial movement between pump 10 and generator 12, the splined extension of generator shaft 176 will drivingly engage rotor 24 of the pumping mechanism. At the same time stepped bore 185 will engage stepped pilot 181 to establish the proper radial relation between the units and form return passage 200. Tightening of the three bolts 198 completes the assembly operation. Disassembly is an equally simple task requiring merely the removal of bolts 198 and axial separation of units 10 and 12.

It should be noted that during assembly and disassembly the relation between the shaft seal 178 and shaft 176 is not in any way disturbed. This is an important feature since effectiveness of a shaft seal is very often seriously impaired by nonfactory reassembly.

It is also pointed out that the present invention, by providing an extension of the generator armature shaft to drive the rotor of the pumping mechanism and provide the sole radial support therefor, eliminates the need for any radial bearings in the pumping mechanism 10. A substantial saving in both space and cost is realized by this utilization of the generator armature shaft supports to also provide support for the rotary mechanism of the pump.

Another feature contributing substantially to the low cost of the unit is the manner in which the end bell 170 of generator 12 cooperates with body 14 of the pumping unit to form an end wall therefor. Insertion of stepped pilot 181 into stepped bore 185 provides an end wall which restrains fluid leaking into the shaft clearance bore 189 and also forms the return passage 200 as previously described.

It can be seen that generator unit 12 can be completely fabricated, tested, and used entirely independent of pumping unit 10. Further, pumping unit 10 can be completely assembled and, by the provision of a test stand having a mounting pilot and drive shaft similar to those of generator 12, tested independent of generator unit 12. The separate units 10 and 12 may then at a later date be assembled into the unitary generator pump combination by the simple procedure heretofore described.

In operation, the generator 12 is drivingly connected to the engine of a motor vehicle, and ports 82 and 204 of the pump 10 may be respectively connected to the inlet and return ports of a fluid motor, not shown. As heretofore described, return fluid will enter port 204 and through passages 202, 200, and 206 be conducted to inlet port pockets 92 and 96 where it is available for filling inlet zones 42. Pockets 92 and 96 communicate through passages 103 and 105 with pockets 94 and 98 which in turn, through the venturi throat of sleeves 138 and passages 142, communicate with the interior of tank 58. Thus, quantitative discrepancies between the returning fluid and that being pumped may be compensated by the reservoir. During low speed operation, atmospheric pressure on the fluid in tank 58 will maintain substantially atmospheric pressure in the pockets of the inlet ports. At low speeds, this is sufficient to prevent cavitation. Further, at low speed, barring extreme pressures causing the relief valve to function, the entire output of the pumping mechanism will pass through outlet passage 70 to the outlet connection port 82.

As the speed of the vehicle engine, and hence generator 12 and pump 10, increase, it becomes necessary to bypass part of the pump flow and also to supercharge the pump inlet zones to prevent cavitation. The pumping mechanism of the present invention, by utilizing the fluid bypassed by the spillover flow control valve 110 to produce inlet zone supercharge, insures a timely change from nonsupercharged to supercharged operation. On opening of valve 110, part of the fluid being pumped is diverted into the transverse bore 116. Substantially one half the diverted flow passes to the central passage 134 in each of the spools 128. Because of the relatively small cross-section of passages 134, a high velocity stream is directed through the venturi throat of each sleeve 138 into the inlet port pockets 94 and 98, which through passages 103 and 105 communicate with pockets 92 and 96, respectively. In the relative quiesence of the inlet port pockets the kinetic energy of the high velocity streams is in part transformed into static pressure which supercharges the inlet zones. Fluid from reservoir 58 is conducted through passages 142 to surround the high velocity streams, and fluid necessary for replenishing is then picked up, as in a jet pump, and carried to the inlet port pockets.

There has thus been provided a low cost, compact, and easily assembled generator and fluid pump combination, the component units of which are capable of independent manufacture, testing, and use.

Further, the invention provides pumping mechanism particularly well suited for the high speeds encountered in motor vehicle generator operation by provision of novel means for supercharging the pump inlet zones.

While the form of embodiment of the invention as herein disclosed constitutes a preferred form, it is to be understood that other forms might be adapted, all coming within the scope of the claims which follow.

What is claimed is as follows:

1. In combination: a fluid pressure energy translating device comprising a housing member having a rotor therein; a mounting member; a drive shaft extending from the mounting member and having coupling means to engage said rotor on relative axial movement therebetween; shaft bearing and sealing means in the mounting member; pilot means to establish a particular positional relation between the members; means for securing said housing and mounting members axially together; port means in said housing member adjacent said rotor; external connection port means in one of said members; means forming a fluid passage interconnecting said external connection port and said port means, said passage forming means comprising portions of said housing and mounting members in fluid sealing engagement at two spaced apart positions having clearance space therebetween.

2. In combination: a fluid pressure energy translating device comprising a housing member having a rotor therein; a mounting member; a drive shaft extending from the mounting member and having coupling means to engage said rotor on relative axial movement therebetween; shaft bearing and sealing means in the mounting member; pilot means to establish a particular positional relation between the members; means for securing said housing and mounting members axially together; port means in said housing member adjacent said rotor; external connection port means in one of said members; means forming a fluid passage interconnecting said external connection port and said port means, said passage forming means comprising a stepped pilot on one of said members inserted into a corresponding stepped bore in the other member to leave axial clearance space between the shoulders thereof, and to seal said clearance space against leakage.

3. In combination: a fluid pressure energy translating device comprising a housing member having a rotor therein; a mounting member; a drive shaft extending from the mounting member and having coupling means to engage said rotor on relative axial movement therebetween; shaft bearing and sealing means in the mounting member; pilot means to establish a particular positional relation between the members; means for securing said housing and mounting members axially together; port means in said housing member adjacent said rotor; external connection port means in one of said members; means forming a fluid passage interconnecting said external connection port and said port means, said passage forming means comprising a stepped pilot in one of said members inserted into a corresponding stepped bore in the other member to leave axial clearance space between the shoulders thereof, and to peripherally engage said bore at points axially spaced on either side of said clearance space.

4. In a fluid pressure energy translating device of the type having a stator with a rotor telescopically disposed therein to include inlet and outlet zones therebetween; head and body members having faces in fluid sealing abutment with axially opposed sides of the rotor and stator; outlet port means in one of said faces overlying said outlet zone; inlet port means comprising a recess in the face of said head member forming a pocket laterally bounded by said abutting faces and overlying said inlet zone; and jet pump means in said head member for producing a high velocity fluid jet directed to said recess to raise the fluid pressure therein.

5. In a fluid pressure energy translating device of the type having a stator with a rotor telescopically disposed therein to include inlet and outlet zones therebetween; head and body members having faces in fluid sealing abutment with axially opposed sides of the rotor and stator; outlet port means in one of said faces overlying said outlet zone; inlet port means comprising a first recess in said face of one of said members forming a pocket laterally bounded by said abutting faces and overlying said inlet zone, and a second recess, in said face of the other of said members, forming a second pocket laterally bounded by said abutting faces and overlying said inlet zone, said second recess being angularly coincident with said first recess; fluid passage means for connecting said first and second recesses, including an axial passage through said stator; and jet pump means in one of said members for producing a high velocity fluid jet directed to one of said recesses to raise the fluid pressure therein.

6. In a fluid pressure energy translating device of the type having a stator with a rotor telescopically disposed therein to include inlet and outlet zones therebetween; head and body members having faces in fluid sealing abutment with axially opposed sides of the rotor and stator; outlet port means in one of said faces overlying said outlet zone; inlet port means comprising a first recess in said face of one of said members forming a pocket laterally bounded by said abutting faces and overlying said inlet zone, and a second recess, in said face of the other of said members, forming a second pocket laterally bounded by said abutting faces and overlying said inlet zone, said second recess being angularly coincident with said first recess; fluid return conduit means in said one member leading to said recess therein; and jet pump means in said other member for producing a high velocity fluid jet directed to said second recess to raise the fluid pressure therein.

7. In a fluid pressure energy translating device of the type having a stator with a rotor telescopically disposed therein to include inlet and outlet zones therebetween; head and body members having faces in fluid sealing abutment with axially opposed sides of the rotor and stator; outlet port means in one of said faces overlying said outlet zone; inlet port means comprising a first recess in said face of one of said members forming a pocket laterally bounded by said abutting faces and overlying said inlet zone, and a second recess, in said face of the other of said members, forming a second pocket laterally bounded by said abutting faces and overlying said inlet zone, said second recess being angularly coincident with said first recess; fluid passage means for connecting said first and second recesses, including an axial passage through said stator; fluid return conduit means in said one member leading to said recess therein; and jet pump means in said other member for producing a high velocity fluid jet directed to said second recess to raise the fluid pressure therein.

8. In combination: a fluid pressure energy translating device comprising a housing member having a rotor therein; a mounting member; a drive shaft extending from the mounting member and having coupling means to engage said rotor on relative axial movement therebetween; shaft bearing means in the mounting member; pilot means to establish a particular positional relation between the members; means for securing said housing and mounting members axially together; port means in said housing member adjacent said rotor; external connection port means in one of said members; means forming a fluid passage interconnecting said external connection port and said port means, said passage forming means comprising portions of said housing and mounting members in fluid sealing engagement at two spaced apart positions having clearance space therebetween.

References Cited in the file of this patent
UNITED STATES PATENTS

| | | |
|---|---|---|
| 1,443,644 | Nobuhara | Jan. 30, 1923 |
| 1,751,209 | Kucher | Mar. 18, 1930 |
| 2,272,926 | Squiller | Feb. 10, 1942 |
| 2,411,781 | Fell | Nov. 26, 1946 |
| 2,500,216 | Szekely | Mar. 14, 1950 |
| 2,531,726 | Durdin, III | Nov. 28, 1950 |
| 2,544,988 | Gardner et al. | Mar. 13, 1951 |